United States Patent [19]
Korall et al.

[11] Patent Number: 5,516,599
[45] Date of Patent: *May 14, 1996

[54] MEANS FOR STORAGE AND TRANSPORTATION OF ELECTRIC FUEL

[75] Inventors: Menachem Korall; Jonathan R. Goldstein, both of Jerusalem; Menachem Givon, Mobile Post Hanegev, all of Israel

[73] Assignee: Electric Fuel (E.F.L.) Ltd., Jerusalem, Israel

[*] Notice: The term of this patent shall not extend beyond the expiration date of Pat. No. 5,411,815.

[21] Appl. No.: 353,828

[22] Filed: Dec. 12, 1994

Related U.S. Application Data

[63] Continuation-in-part of Ser. No. 122,718, Sep. 15, 1993, Pat. No. 5,411,815.

[30] Foreign Application Priority Data

Sep. 15, 1992 [EP] European Pat. Off. .............. 92308403

[51] Int. Cl.⁶ ...................................................... H01M 2/10
[52] U.S. Cl. ................................ 429/48; 429/58; 429/70; 429/88
[58] Field of Search .................................. 429/48, 87, 88, 429/50, 57, 58, 70, 80

[56] References Cited

U.S. PATENT DOCUMENTS 3,531,327 9/1970 Moos .
4,618,544 10/1986 Brooks ..................................... 429/88 X
4,788,111 11/1988 Niksa et al. ............................... 429/27
5,411,815 5/1995 Goldstein .................................. 429/50

FOREIGN PATENT DOCUMENTS 4-328241 11/1992 Japan .

Primary Examiner—Stephen Kalafut
Attorney, Agent, or Firm—Helfgott & Karas

[57] ABSTRACT

The invention provides a rigid reusable transport and storage vessel for retaining a plurality of anode cassettes of pressed zinc particles saturated with aqueous alkaline solution, and utilizable as an electric fuel in a zinc-air battery, the vessel having a sealably covered aperture and being provided with a hydrogen recombination device, the device being provided with an external surface at least part of which projects into the air surrounding the vessel for venting any hydrogen produced by the anode cassettes into the air surrounding the vessel, and the vessel being internally compartmentalized to contain a plurality of sealable internal compartments for retaining the plurality of anode cassettes, each of the internal compartments being provided with a gas non-return valve venting from the internal compartment to an interior space of the vessel for venting generated hydrogen from the cassettes via the gas non-return valve to the vessel for elimination via the hydrogen recombination device while preventing ingress of air to the internal compartments, whereby hydrogen internally generated and emitted from the vessel is safely combined with the oxygen in the air surrounding the vessel, thus eliminating potentially explosive hydrogen.

6 Claims, 2 Drawing Sheets

FIG. 1a
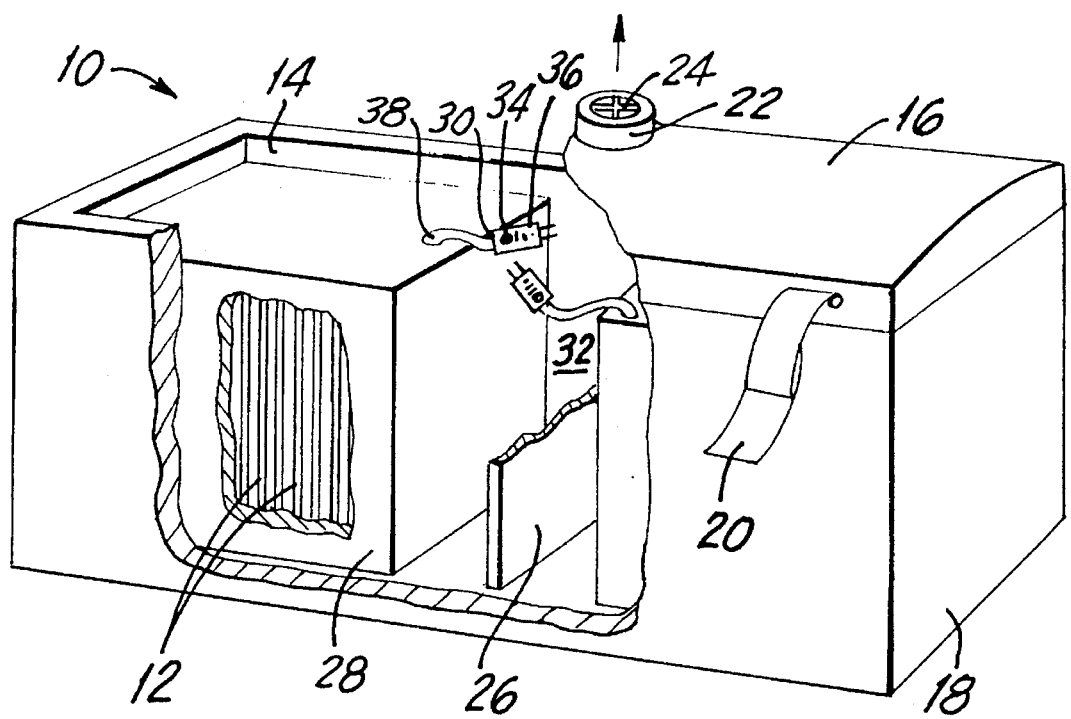
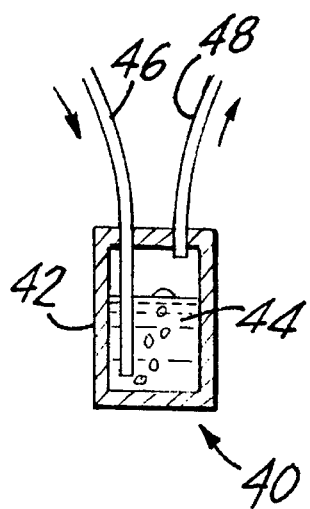
FIG. 1b
FIG. 2
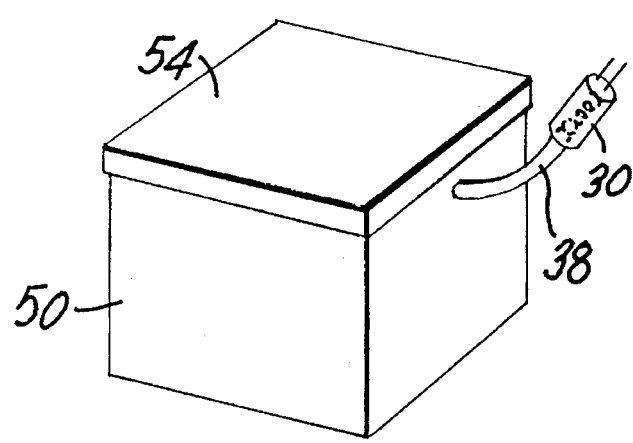

MEANS FOR STORAGE AND TRANSPORTATION OF ELECTRIC FUEL

The present application is a continuation-in-part of U.S Ser. No. 08/128,718, filed Sep. 15, 1993, now U.S. Pat. No. 5,411,815 entitled "A Transport and Storage Vessel for Electric Fuel."

The present invention relates to a storage and transport vessel for electric fuel. More particularly, the present invention relates to a storage and transport vessel for transporting anode cassettes of pressed zinc saturated with aqueous alkaline solution utilizable as an electric fuel in a zinc-air battery.

Various proposals have been made in the past for electrically-powered vehicles. To date, for a number of reasons, electric vehicle systems have yet to become commercially viable generally, for urban highway applications. There have been proposals to employ zinc-air batteries for urban vehicle propulsion. An example is the following publication: "Improved Slurry Zinc-Air Systems as Batteries for Urban Vehicle Propulsion," by P. C. Foller, *Journal of Applied Electrochemistry*, 16 (1986), 527–543.

"Machine Design" of Sep. 21, 1989, carried a review of electric batteries and vehicles and found that delivery vans were likely to be the first commercially-produced electrically driven vehicles.

The Bedford CF electric van, using a lead-acid battery, is in production in the United Kingdom. It has a 50–60 mile range and a top speed of 50 mph, as reported by the Standard Handbook for Electrical Engineers.

Metal-air battery structures are described in the following publications: U.S. Pat. No. 4,842,963, entitled "Zinc Electrode and Rechargeable Zinc-Air Battery;" U.S. Pat. No. 4,147,839, entitled "Electrochemical Cell with Stirred Slurry;" U.S. Pat. No. 4,908,281, entitled "Metal-air Battery with Recirculating Electrolyte;" U.S. Pat. No. 3,847,671, entitled "Hydraulically Refuelable Metal-Gas Depolarized Battery system;" U.S. Pat. No. 4,925,744, entitled "Primary Aluminum-Air Battery;" U.S. Pat. No. 3,716,413, entitled "Rechargeable Electrochemical Power Supply." In U.S. Pat. No. 3,592,698, entitled "Metal Fuel Battery with Fuel Suspended in Electrolyte," there is described inter alia a method for circulating an electrolyte/metal fuel powder mixture through the battery; U.S. Pat. No. 4,126,733, entitled "Electrochemical Generator Comprising an Electrode in the Form of a Suspension," relates to a similar subject using a circulated suspension of inert cores coated with an electrochemically active material. In U.S. Pat. No. 4,341,847, entitled "Electrochemical Zinc-Oxygen Cell," there is described a method in which an electrolyte is circulated in the annular space between concentric electrodes.

Electrical energy storage systems are described in the following publications: U.S. Pat. No. 4,843,251 entitled "Energy Storage and Supply;" "Energy on Call," by John A. Casazza et al., *IEEE Spectrum*, Jun. 1975, pp. 44–47; U.S. Pat. No. 4,275,310, entitled "Peak Power Generation;" U.S. Pat. No. 4,124,805, entitled "Pollution-Free Power Generating and Peak Power Load Shaving System;" U.S. Pat. No. 4,797,566, entitled "Energy Storing Apparatus."

Regeneration of spent zinc-containing alkaline electrolyte is described in a number of prior patents. For example, in U.S. Pat. No. 3,847,671 (mentioned above) whole spent electrolyte is subjected to electrolysis, when zinc deposited at the cathode is removed with a wiper blade. The thus-removed zinc is said to be substantially heavier than the electrolyte (35–40% KOH) and thus falls to the bottom of each cell. In U.S. Pat. No. 3,981,747, it is proposed to regenerate the spent zinc in an alkaline electrolyte by reaction with a strongly-reducing metal, such as magnesium or aluminum, which displaces the zinc. In U.S. Pat. No. 4,341,847 (also mentioned above), spent zinc in the alkaline electrolyte is regenerated either by reversing the current and plating zinc on the anode, or by merely mechanically replacing zinc oxide particles by active zinc particles as described, e.g., in Israel Specification 10093, the teachings of which are incorporated herein by reference.

Metal-air and particularly zinc-air battery systems are known in the art and, due to their high energy densities, relative safety of operation and the possibility of ready mechanical recharging, such systems have been suggested as a power source for electrically-propelled automotive vehicles. To date, for various reasons, such systems have yet to meet with significant commercial success.

For use in vehicle propulsion, it is highly desirable that a battery have a high specific energy, relative to its own weight. Lead-acid batteries produce only 30–40 Watt-hours/kilogram, and even the high-temperature Sodium-Sulphur type is rated at only 100 Wh/kg. Herein lies a central advantage of the Zinc-air battery, which is rated at 150–250 Wh/kg., higher than any other rechargeable battery available.

One of the principle drawbacks of battery systems as a power source for automotive vehicle propulsion, and particularly previously-developed zinc-air battery systems, resides in the difficulty in achieving the combination of both a high continuous current drain, such as is needed for extended uphill driving, and short-term high peak power output, such as is needed for quick acceleration, while at the same time maintaining a high energy density and facilitating rapid rechargeability.

On the one hand, in order to achieve high continuous current drain, a large reservoir of active anode material is needed. Due to space and other consideration, this is generally best achieved by incorporation of a highly-porous, active anode element having large-surface active anodic material.

By contrast, in order to achieve high peak power output, i.e. the ability to provide a very high level of power for a short burst of time, studies have found that a tight interparticulate structure of the active anodic material is advantageous. This results in a low porosity with known powdered anodes and can drastically reduce the current capacity of the battery.

To date, in known-in-the-art battery systems, much emphasis has been placed on achieving high capacity. Zinc anodes in various battery systems are generally formed in one of two broad families of processes: According to one family, particularly applicable to primary alkaline batteries, the anodes are constructed from finely-powdered zinc, typically produced by a thermal atomization process. The resultant zinc power typically has a particulate size distribution of between 0.0075 to 0.8 mm and a surface area of between 0.2–0.4 $m^2/g$; it is generally combined with mercury, sodium carboxymethyl cellulose and KOH solution to form a gelled mass readily extruded into an anode form. Alternatively, the powdered zinc may be sintered, or wetted with mercury and pressed into a plate. Porosity of the anode may be controlled by use of removeable pore-forming materials such as $NH_4Cl$. The density of the zinc anode material precursor used for such methods is typically within the range of 2.5–3.5 gr/cc.

According to the second family of processes, exemplified by an anode proposed by Ross, U.S. Pat. No. 4,842,963, claimed to be particularly suitable for electrically-rechargeable zinc-air batteries, the electrode is prepared by electrolytically depositing zinc on the internal surface of a foam electrode support to form a zinc electrode. Said patent, however, claims an improved zinc electrode for a rechargeable zinc-air battery, comprising an outer frame, a porous foam electrode support within said frame having zinc deposited thereon and treated prior to the deposition of zinc thereon to inhibit the formation of zinc dendrites on the external surface thereof, and means within said outer frame for circulating an alkaline electrolyte through the interior of said treated zinc-coated porous foam, and a battery system which requires the inclusion of circulation means for a circulating alkaline electrolyte through the interior thereof is not practical or desirable.

At typical current densities it has been found that zinc-air batteries in which the anodes are constructed according to the above methods fail to provide a combination of rapid rechargeability, high current capacity and high peak power output. Hence, it would be desirable to provide an anode capable of providing a battery with all of these attributes, i.e. high current density, rapid rechargeability, high current capacity and high peak power output.

In an effort to further increase the advantages of using zinc-air battery systems for electro-automotive propulsion, in co-pending U.S. Ser. No. 08/277,708, filed Jul. 20, 1994, the teachings of which are incorporated by reference, there is described and claimed a zinc battery anode comprising a substantially planar skeletal frame including conductive metal and having a portion of a surface area thereof formed as open spaces, and further comprising an active zinc anode component compacted into a rigid static bed of active anode material of tight interparticulate structure encompassing the skeletal frame, said active anode component being formed of a slurry of granules comprising zinc having an initial density of between 0.2 and 2.0 gr/cc, said zinc being impregnated with and suspended in an electrolyte and compacted under pressure to itself and to the skeletal frame to form a porous active zinc anode element having a density in the range of 0.5–3.0 gr/cc, said electrolyte consisting of an aqueous solution of a hydroxide of a group Ia metal.

Said specification, however, does not teach or suggest a method for transporting such anodes and storing them for extended periods of time.

Moreover, there is a problem also with transporting and storing slurry in bulk for on-site filling of anodes with charged-slurry or off-loading spent slurry.

Thus, it will be realized that in this type of battery electric fuel is primarily a slurry of zinc particles and KOH solution with optional additives. In battery refuelling, anode cassettes containing a pre-determined quantity of slurry pressed into each individual copper-based current collector, are inserted into each individual cell of the zinc-air battery, and the cells are topped up as required with KOH solution. Cassettes containing spent slurry are previously withdrawn from the battery for regeneration.

The chemical safety constraints in storage/transport deal essentially with the tendency of the KOH-wetted slurry to gas flammable hydrogen according to the reaction $Zn+H_2O=ZnO+H_2$ or to be oxidized by oxygen of the air according to the reaction $2Zn+O_2=2ZnO$, especially if in contact with foreign metal (self-discharge), or (if left exposed) the tendency to dry out. KOH solution is also a chemical hazard due to its caustic properties.

In allowed co-pending U.S. Ser. No. 08/127,778, filed Sep. 15, 1993, the teachings of which are also incorporated herein by reference, there is described and claimed a refueling system for automated recharging of zinc-air batteries of the type having a plurality of active zinc anode elements each formed of active zinc material compactly pressed to a support frame immersed in an aqueous alkaline electrolyte in a battery casing, each anode element being in alternate array with an air cathode, said system comprising:

a) automated means for simultaneously separating a plurality of spent zinc anode elements from said battery casing; the zinc in said spent zinc anode elements comprising zinc which has been at least partially oxidized.

b) means for removing used electrolyte from said casing;

c) transport means for conveying spent anodes to an anode processing station;

d) said anode processing station, at which said zinc, which has been at least partly oxidized, is removed from said support frame;

e) means for attaching new or reconstituted active zinc material to a cleaned support frame, comprising a press provided with a container configured to hold said frame immersed in a pre-weighed zinc slurry, said press being provided with means for applying a pressure of at least 20 kg/cm2 over the surface of said slurry, to form an active zinc anode, having active zinc material compactly pressed to support frame;

f) automated means for simultaneously introducing a plurality of active zinc anodes into said casing; and g) means for introducing fresh electrolyte into said casing.

Said specification, however, also did not teach or suggest the improved transport and storage vessel described and defined hereinafter.

With this state of the art in mind, there was described and claimed in allowed U.S. application Ser. No. 08/127,718, filed Sep. 15, 1993, and the teachings of which are incorporated herein by reference, a rigid reusable transport and storage vessel containing a slurry of zinc particles and an aqueous alkaline solution utilizable as an electric fuel for a zinc-air battery, said vessel being provided with at least one hydrogen combination device having an external surface, at least part of which projects into the air surrounding the vessel for venting any $H_2$ produced by said slurry for contact and combination at said external surface with oxygen in the air surrounding said vessel, whereby contact of the $H_2$ internally generated and emitted from said vessel with the oxygen in the air surrounding said vessel eliminates potentially explosive hydrogen.

In said specification, there was also described and claimed a rigid reusable transport and storage vessel for retaining a plurality of slurry containing anode cassettes, said vessel being internally compartmentalized for retaining said plurality of anode cassettes and being provided with entry and exit ports for introducing and draining an aqueous alkaline solution, as well as with hydrogen vents, said vents being provided with an external surface at least part of which projects into the air surrounding said vessel for venting $H_2$ produced by said slurry for contact and combination at said external surface with oxygen in the air surrounding the vessel, whereby contact of the $H_2$ internally generated and emitted from said vessel with the oxygen in the air surrounding said vessel eliminates potentially explosive hydrogen.

In continuation of said invention and as a further improvement thereon, the present invention provides a rigid reusable transport and storage vessel for retaining a plurality of anode cassettes of pressed zinc particles saturated with aqueous alkaline solution, and utilizable as an electric fuel in a zinc-air battery, said vessel having a sealably covered aperture and being provided with a hydrogen recombination device, said device being provided with an external surface at least part of which projects into the air surrounding said vessel for venting any hydrogen produced by said anode cassettes into the air surrounding said vessel, and said vessel being internally compartmentalized to contain a plurality of sealable internal compartments for retaining said plurality of anode cassettes, each of said internal compartments being provided with a gas non-return valve venting from said internal compartment to an interior space of said vessel for venting generated hydrogen from said cassettes via said gas non-return valve to said vessel for elimination via said hydrogen recombination device while preventing ingress of air to said internal compartments, whereby hydrogen internally generated and emitted from said vessel is safely combined with the oxygen in the air surrounding said vessel, thus eliminating potentially explosive hydrogen.

In its preferred embodiments, the present invention provides a rigid reusable transport and storage vessel, as defined, in combination with a plurality of anode cassettes of pressed zinc particles saturated with aqueous alkaline solution and utilizable as an electric fuel in a zinc-air battery retained therein.

In especially preferred embodiments of the present invention, each cassette is individually wrapped in a protective enclosing bag, a plurality of bag-enclosed cassettes is further enclosed in a sealable cushioning bag, and said sealable cushioning bag is provided with an inert atmosphere before closure.

Thus, in contradistinction to the previously-defined embodiments, which primarily envisaged a vessel internally compartmentalized with a racking arrangement to hold the anode cassettes in place and entry and exit pipes for KOH fill/drain and flush, the present invention provides a sealable vessel having a plurality of separately sealable internal compartments, wherein each of said compartments is provided with a gas non-return valve, in addition to the hydrogen vent of the enveloping vessel, and which internal compartments, in turn, contain a plurality of bag-enclosed cassettes.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the Drawings FIG. 1a is a fragmented perspective view of a preferred embodiment of the reusable transport and storage vessel, according to the invention;

FIG. 1b is a sectional elevational view of a further embodiment of the non-return valve used to prevent air re-entry;

FIG. 2 is a perspective view of an internal compartment for use in the vessel shown with reference to FIG. 1a; and FIGS. 3 and 4 are sectional elevational views of two further embodiments of an internal compartment usable in the vessel shown in FIG. 1a.

Figure 3:
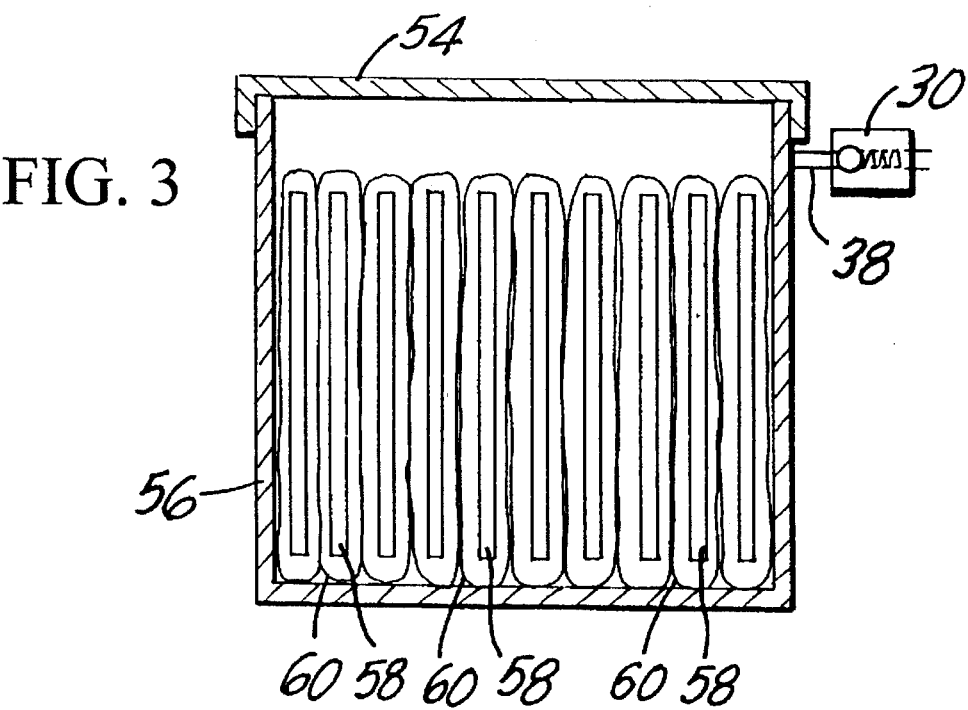

There is seen in FIG. 1a a rigid reusable transport and storage vessel 10, made of strong alkali-resistant material, suitably a plastic such as for example glass-reinforced polypropylene, which is strong, chemically resistant and light-weight.

The vessel 10 holds a plurality of anode cassettes 12 of pressed zinc particles saturated with aqueous alkaline solution, which is utilizable as an electric fuel in a zinc-air battery.

The anode cassettes 12 as inserted in the vessel 10 for transport to or from a regeneration facility are drip free; due to the absence of any external alkaline liquid, the transportation weight comprises only that of the cassettes, apart from the vessel and its associated components.

The vessel 10 has a sealably covered aperture 14. An internally domed lid 16 is conveniently held to the vessel body 18 by closure clasps 20.

Attached to the highest point of the lid 16 is a hydrogen recombination device 22. The device 22 comprises a vent holding a catalytic gas recombining unit, as commercially available from the Hydrocap Corp., Miami, Fla. The device 22 combines oxygen from the surrounding air with the emitted hydrogen at a controlled rate, producing water vapor and heat, and is provided with an external surface 24, at least part of which projects into the air surrounding the vessel for venting thereto.

The vessel 10 is internally compartmentalized by partitions 26 to retain a plurality of sealable internal compartments 28, each of which retains a plurality of anode cassettes 12. Each internal compartment 28 is provided with a gas non-return valve 30 venting from the internal compartment 28 to an interior space 32 of the vessel 10.

In the shown embodiment, the conventional design non-return valve 30 is of the mechanical type, and has a rubber ball 34 and a spring 36 acting thereon. The valve 30 is conveniently attached to a vent tube 38. Thus, any generated hydrogen from the cassettes 12 is vented via the gas non-return valve 30 and via the vent tube 38 to the interior space 32. From there it is eliminated via the hydrogen recombination device 22. Ingress of air to the internal compartments 28 is prevented by the valve 30.

Thereby, a self-discharge reaction $2Zn+O_2=2ZnO$ is obviated, while internally-generated, potentially explosive hydrogen is safely eliminated.

Seen in FIG. 1b is a further valve embodiment 40 of the non-return valve used to prevent air re-entry into the compartments 28, described with reference to FIG. 1a.

Hydrogen gas enters a container 42 and a liquid 44 held therein through a first tube 46. The liquid 44 has a freezing point well below 0° C., such as for example a polyglycol. Consequently, the valve 40 does not limit the use of the vessel 10 in cold climates. The emitted gas bubbles through the liquid 44 and exits via a second tube 48.

The liquid phase gas barrier thus prevents the entry of air into the second tube 48.

Referring now to FIG. 2, there is seen an internal compartment 50 for use in the vessel 10, shown with reference to FIG. 1a. The internal compartment 50 is fitted with a separate sealable lid 54.

The individual lids 54 are advantageous for servicing a compartment 50 while preventing any disturbance to the contents of adjacent compartments. The lid 54 is load-free and can suitably be made of an unreinforced polypropylene.

FIG. 3 shows an internal compartment 56 usable in the vessel 10 shown in FIG. 1a. Each cassette 58 is individually wrapped in a protective enclosing bag 60. The bag 60 can suitably be made of linear low-density polyethylene.

The bag 60 protects cassettes 58 from possible mechanical damage in transit.

Figure 4:
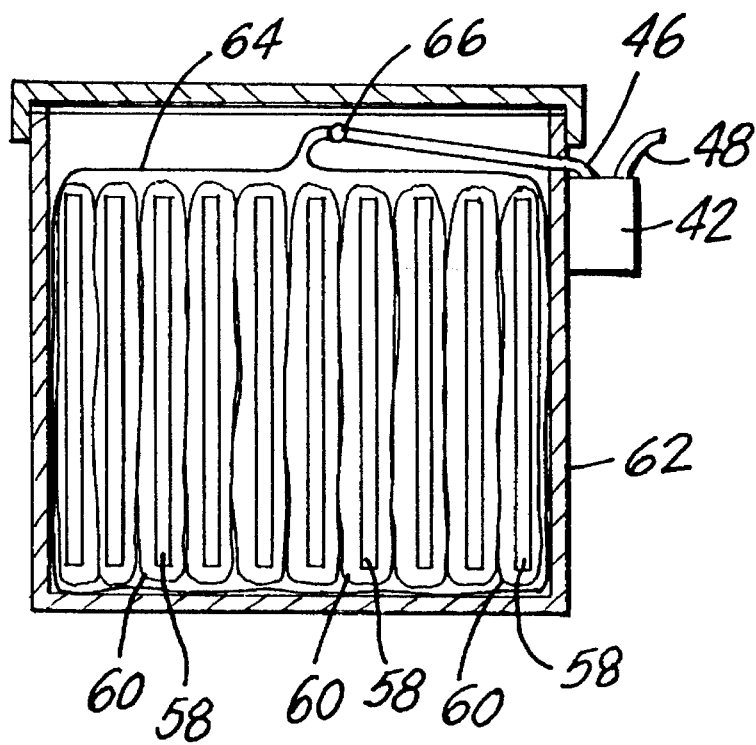

Seen in FIG. 4 is an internal compartment 62 similar to that shown in FIG. 3. Here a plurality of bag-enclosed cassettes 58 is further enclosed in a sealable cushioning bag 64. For convenience, a zipper-type closure 66 is provided at the open top edge of the bag 64.

Advantageously, the bag 64 is provided with an inert atmosphere, such as nitrogen, before closure. The consequent elimination of oxygen from the atmosphere inside the bag 64 prevents unwanted chemical reactions taking place with the pressed zinc anode cassettes 60 held therein. It will be evident to those skilled in the art that the invention is not limited to the details of the foregoing illustrative embodiments, and that the present invention may be embodied in other specific forms without departing from the essential attributes thereof, and it is therefore desired that the present embodiments be considered in all respects as illustrative and not restrictive, reference being made to the appended claims, rather than to the foregoing description, and all changes which come within the meaning and range of equivalency of the claims are therefore intended to be embraced therein.

What is claimed is:

1. A rigid reusable transport and storage vessel for retaining a plurality of anode cassettes of pressed zinc particles saturated with aqueous alkaline solution, and utilizable as an electric fuel in a zinc-air battery, said vessel having a sealably covered aperture and being provided with a hydrogen recombination device, said device being provided with an external surface at least part of which projects into the air surrounding said vessel for venting any hydrogen produced by said anode cassettes into the air surrounding said vessel, and said vessel being internally compartmentalized to contain a plurality of sealable internal compartments for retaining said plurality of anode cassettes, each of said internal compartments being provided with a gas non-return valve venting from said internal compartment to an interior space of said vessel for venting generated hydrogen from said cassettes via said gas non-return valve to said vessel for elimination via said hydrogen recombination device while preventing ingress of air to said internal compartments, whereby hydrogen internally generated and emitted from said vessel is safely combined with the oxygen in the air surrounding said vessel, thus eliminating potentially explosive hydrogen.

2. A rigid reusable transport and storage vessel, according to claim 1, wherein each of said internal compartments is fitted with a separate sealable lid.

3. A rigid reusable transport and storage vessel, according to claim 1, in combination with a plurality of anode cassettes of pressed zinc particles saturated with aqueous alkaline solution and utilizable as an electric fuel in a zinc-air battery retained therein.

4. A rigid reusable transport and storage vessel, according to claim 3, wherein each cassette is individually wrapped in a protective enclosing bag.

5. A rigid reusable transport and storage vessel, according to claim 4, wherein a plurality of bag-enclosed cassettes is further enclosed in a sealable cushioning bag.

6. A rigid reusable transport and storage vessel, according to claim 5, where said sealable cushioning bag is provided with an inert atmosphere before closure.

* * * * *